Dec. 2, 1952            A. RICKENMANN            2,619,950
DEVICE FOR TRUING AND DRESSING GRINDING WORMS
Filed Feb. 16, 1948            12 Sheets-Sheet 4

Fig. 4

Inventor
Alfred Rickenmann
by Singer, Ehlert, Stern & Carlberg
Attorneys

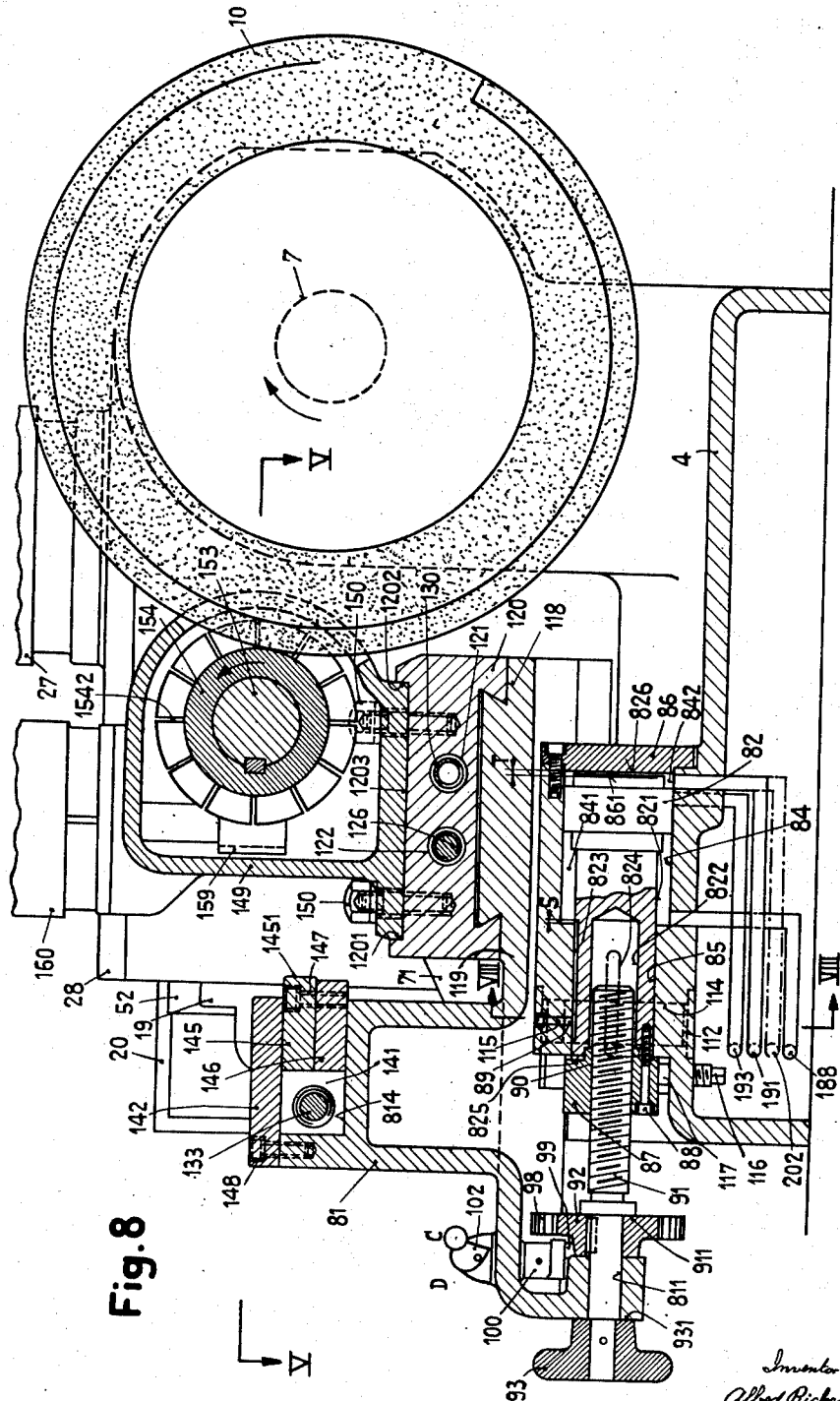

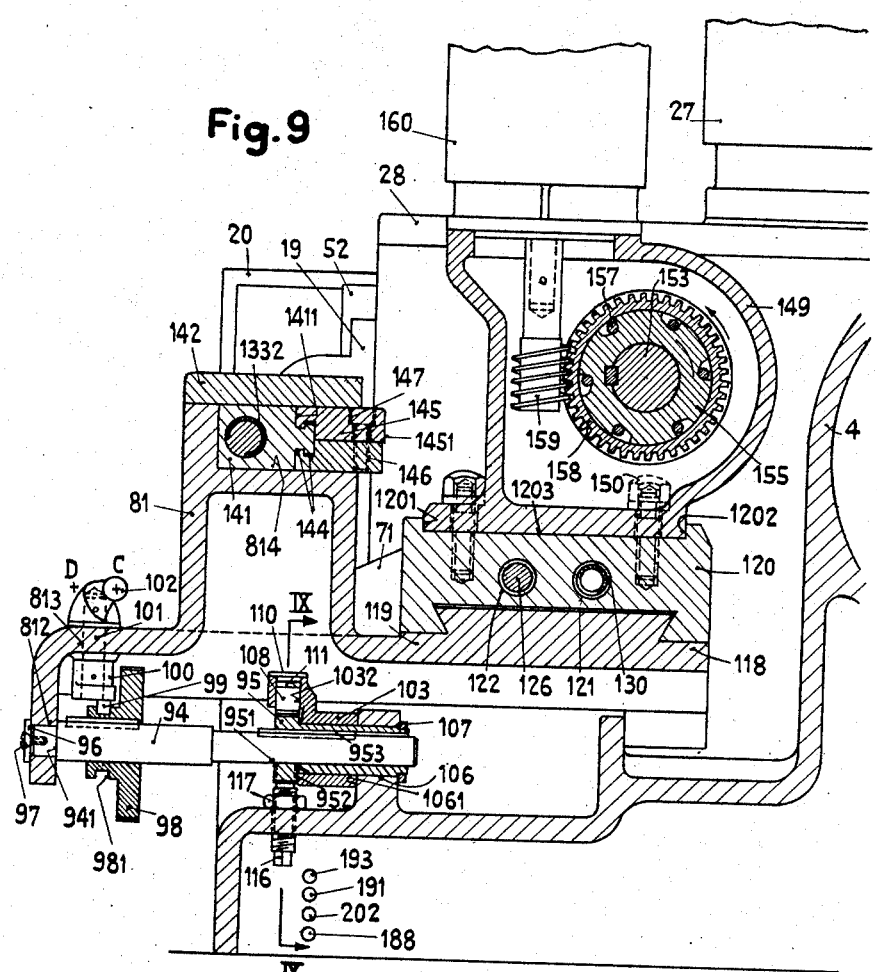
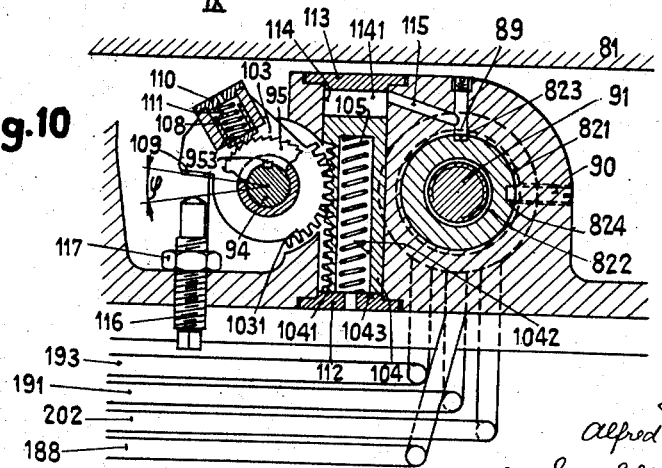

Dec. 2, 1952  A. RICKENMANN  2,619,950
DEVICE FOR TRUING AND DRESSING GRINDING WORMS
Filed Feb. 16, 1948  12 Sheets-Sheet 9

Inventor
Alfred Rickenmann
by Singer, Ehlert, Stern & Carlberg
Attorneys

Dec. 2, 1952  A. RICKENMANN  2,619,950
DEVICE FOR TRUING AND DRESSING GRINDING WORMS
Filed Feb. 16, 1948  12 Sheets-Sheet 12

Inventor
Alfred Rickenmann
by Singer, Ehlert, Stern & Carlberg
Attorneys

Patented Dec. 2, 1952

2,619,950

UNITED STATES PATENT OFFICE 2,619,950

DEVICE FOR TRUING AND DRESSING GRINDING WORMS

Alfred Rickenmann, Kusnacht, near Zurich, Switzerland, assignor to Reishauer-Werkzeuge A.-G., Zurich, Switzerland Application February 16, 1948, Serial No. 8,695

19 Claims. (Cl. 125—11)

The invention relates to improvements in devices for truing and dressing the worm-shaped grinding wheel of gear grinding machines which produce gear teeth.

It is an object of the present invention to employ as truing and dressing tools press rolls and non-rotatable tools carrying diamonds. The profile of the grinding worm is preshaped or reconditioned by means of a press roll and then the finish or final dressing of the profile is accomplished by means of diamonds which latter work upon the sides of the profile of the grinding worm helix and produce the desired grinding surfaces with great accuracy.

A principal object of the present invention is to provide novel means for controlling the truing and dressing tools.

Another object of the invention is to provide a press roll with an automatically actuated feed device. Furthermore, means are provided for preventing a rapid wear of the highly stressed press roll.

It is also an object of the invention to provide means which enable the diamond tools to be moved parallel to the sides of the profile of the grinding wheel.

Still another object of the invention is to provide means for oscillating the diamonds during their engagement with the grinding worm to be dressed. This oscillating movement of the diamonds is of advantage and insures a clean and smooth dressing of the grinding worm.

It is also an object of the invention to provide means for producing a grinding worm which is particularly adapted to grind gears which are subjected to high loads. Gears of this type are frequently ground somewhat thinner at their head portions as would be required by the involute which determines the standard or normal shape of the gear teeth. It is, therefore, possible to employ the dressing device of the invention for producing modified profiles on grinding worms so that the latter are particularly suitable for grinding gears having the above mentioned modified gear teeth.

Other objects of the invention will be specifically pointed out in the description forming a part of this specification, but it is to be understood that the invention is not limited to the embodiment herein described, as various forms may be adopted within the scope of the appended claims. The drawings illustrate by way of example one embodiment of the truing and dressing device of the invention.

In the drawings:

Fig. 4 is a cross sectional view on the line II—II of Fig. 3.

Fig. 8 is a sectional view on the line VI—VI of Fig. 7 and illustrates certain members of the automatic feed device for the press roll.

Fig. 9 is a sectional view on the line VII—VII of Fig. 7 and illustrates additional feed members of the feed device and the drive members for the press roll.

Fig. 10 is a cross sectional view of the automatic feed device on the line VIII—VIII of Fig. 8 and line IX—IX of Fig. 9 respectively.

Drive mechanism

Figure 2:
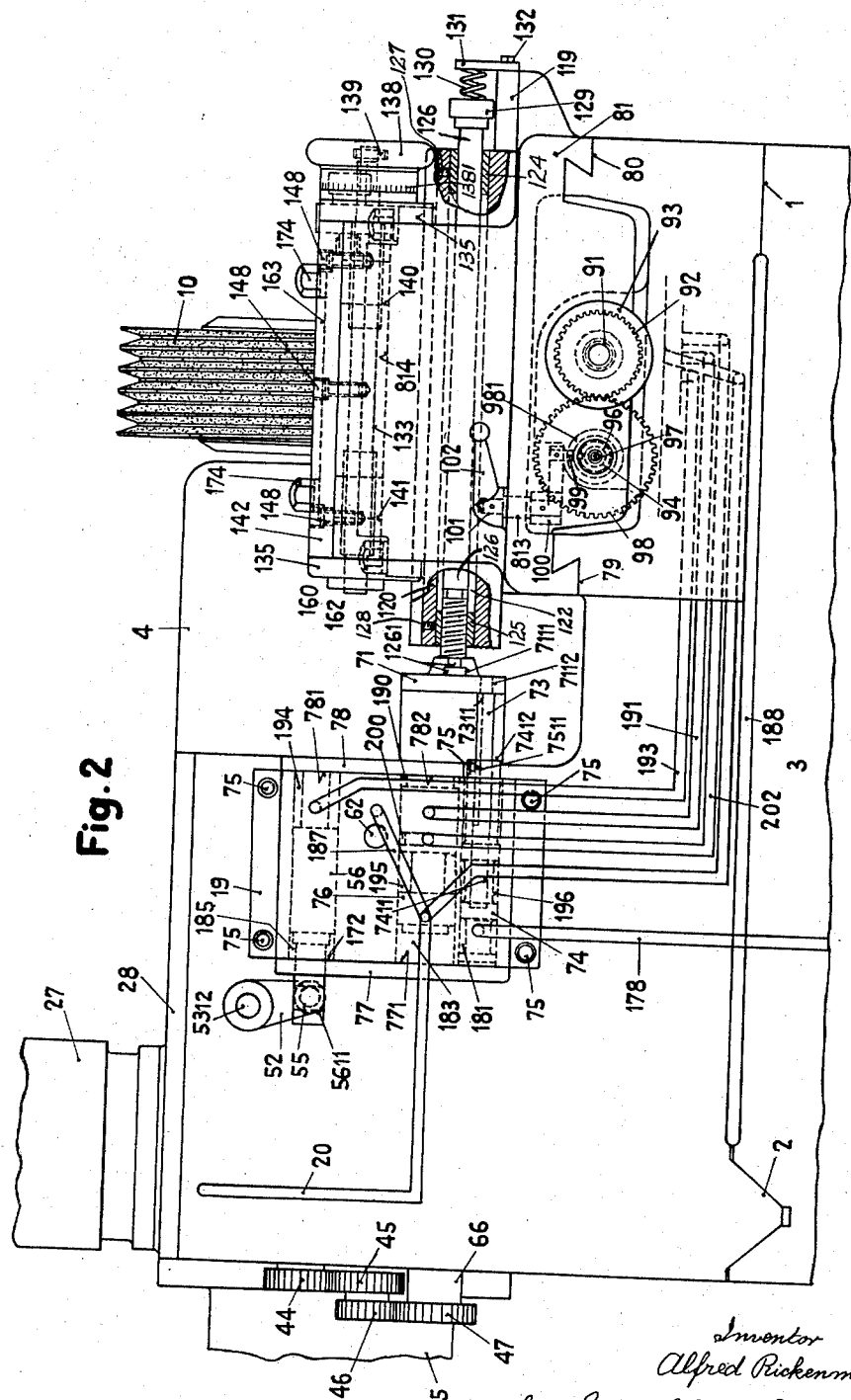
Fig. 2 is a side elevation view of the grinding carriage with the dressing device mounted thereon as shown in Fig. 1.

Referring to the drawings, particularly Fig. 2, the frame 3 of the gear grinding machine is provided with guide tracks 1 and 2 on which a grinding carriage 4 is slidably mounted. The grinding carriage 4 is adapted to be adjusted along the guide tracks 1 and 2 by conventional means which are not illustrated because they do not have any particular bearing on the present invention.

Figure 3:
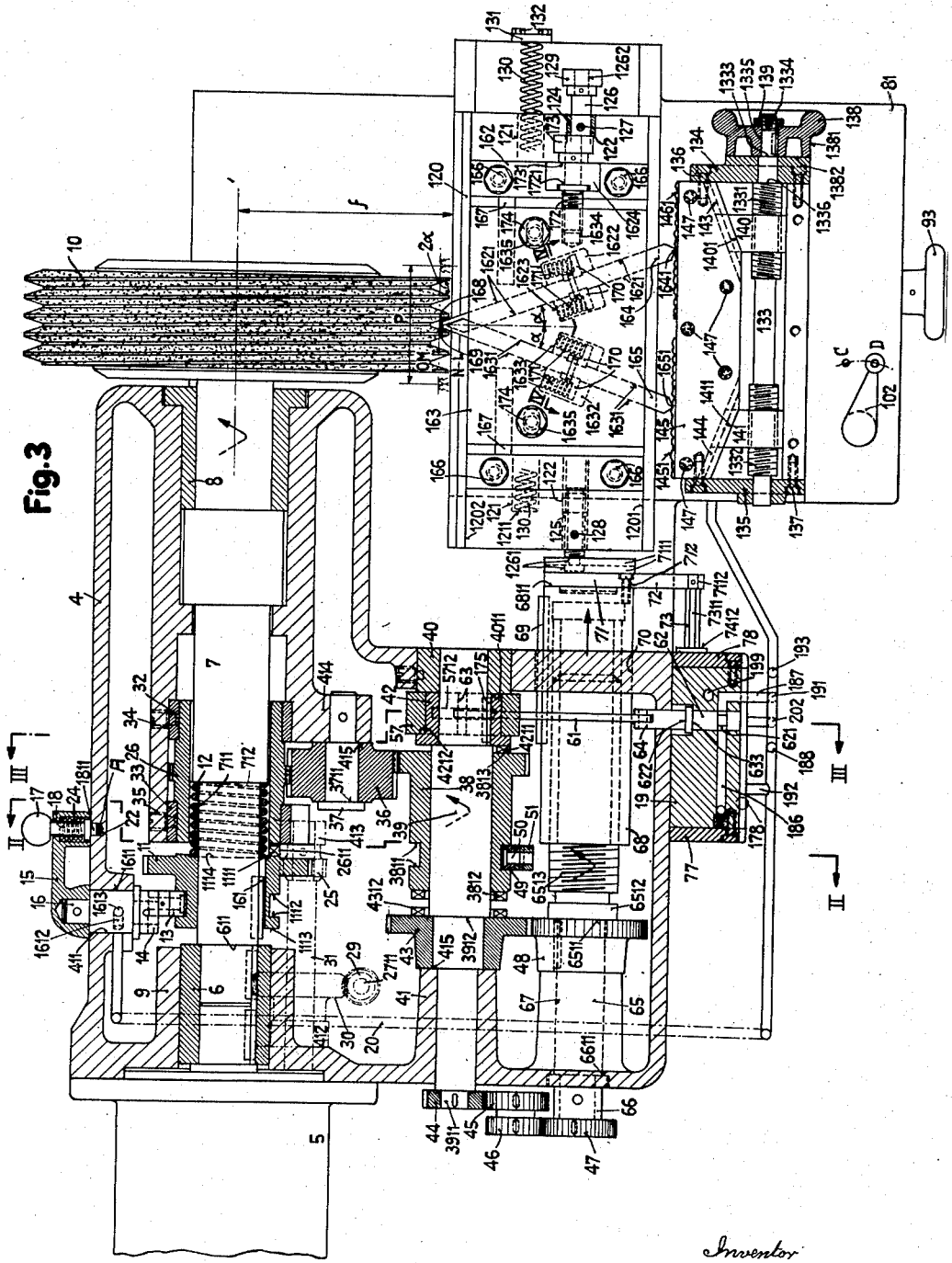
Fig. 3 illustrates substantially a horizontal sectional view on the line I—I of Fig. 1 and shows the diamond dressing tools in engagement with a grinding worm.
Figure 5:
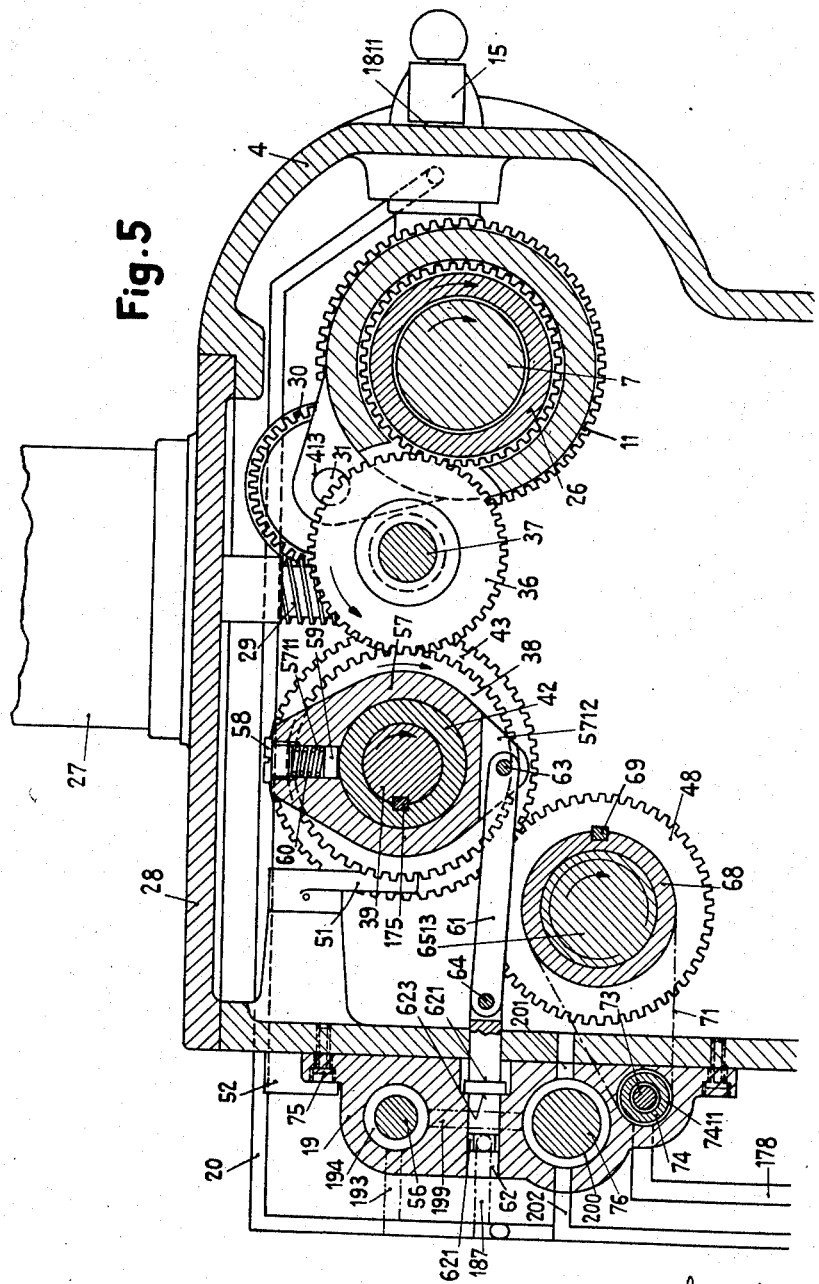
Fig. 5 is a cross sectional view on the line III—III of Fig. 3.

An electric motor 5 (Figs. 2 and 3) is attached by means of a flange to the grinding carriage 4 and is operatively connected by a sleeve 6 (Fig. 3) with the grinding wheel spindle 7. The latter is supported rotatably in the bearings 8 and 9 and carries at its right hand end an overhung grinding worm 10. The grinding wheel spindle 7 is provided between its ends with a reduced cylindrical portion 711 which extends between the annular end faces 611 and 712 and is employed for supporting axially slidably thereon a spur gear 11 having at one end face a coupling tooth 1111 and has its hub provided with an annular guide groove 1112. A helical spring 12 on the portion 711 rests with one end against the annular end face 712 of the spindle 7 and with its other end against the end face 1114 of the spur gear 11 and urges the spur gear 11 continuously to the left (Fig. 3). A block 13 engages the annular guide groove 1112 of this spur gear 11 and is rotatably attached to a lever 14 which is fixedly attached to one end of a short shaft 16 rotatably mounted in a bore 411 of the carriage 4. The other end of the shaft 16 extends outwardly of the carriage 4 and has fixedly attached thereto a lever 15 which is provided with a handle 17. The handle 17 has mounted thereon an adjusting pin 18 which is slidably mounted in a transverse bore of the lever 15 and is urged by a spring 24 mounted in this bore downwardly in a direction in which the outer end 1811 of the pin 18 is urged against the outer surface of the carriage 4 and is adapted to be inserted selectively in two sockets 22 and 23 (Fig. 4) which indicate two different operating positions A and B of the shaft 16. The center portion 1611 of the shaft 16 which is mounted in the bore 411 is provided with two radial passages 1612 and 1613. Both of these radial passages are arranged in the same plane with a conduit 20 and with a drain passage 21 (Fig. 14) and upon proper positioning of the shaft 16 the conduit 20 can be connected with the passage 21.

It is believed to be apparent from the above that by adjusting the lever 15 the spur gear 11 may be shifted to two different positions which are indicated by the sockets 22 and 23 and designated with A and B respectively. When the lever 15 is adjusted to the position A the outer end 1811 of the adjusting pin 18 enters the socket 22 and thereby holds the lever 15 in this position. The spur gear 11 in this position is in engagement with a spur gear 25 (Fig. 3) and the coupling tooth 1111 of the gear 11 is in engagement with a coupling tooth 2611 of a gear 26 concentrically arranged about the spindle 7. This "A" position is used when the grinding worm is to be trued or dressed, while the "B" position of the lever 15 is used when the grinding worm 10 is used for grinding gears and rotates with a high speed. In the latter case the grinding wheel spindle 7 is driven by the electric motor 5. When the electric motor 5 drives the grinding wheel spindle 7 as just mentioned the end 1811 of the pin 18 is in the socket 23 and the spur gear 11 rotates idly, i. e. it is out of engagement with any driven element.

An electric motor 27 is mounted on the cover 28 and is used for driving the truing device. The two electric motors 5 and 27 are connected with each other in such a manner that the same cannot be put into operation both at the same time. These means are of conventional nature and are not disclosed in detail.

The downwardly projecting end 2711 (Fig. 4) of the armature shaft of the electric motor 27 has attached thereto a worm 29 which is in mesh with a worm gear 30. The latter and the spur gear 25 (Fig. 3) are fixedly mounted on a shaft 31 which is rotatably mounted in the bearings 412 and 413 and is secured against axial movement. The spur gear 25, as has already been mentioned, is in mesh with the spur gear 11 when the latter has been shifted to the position shown in Fig. 3, in which position the grinding worm 10 is to be trued and dressed. In this position the gear 11, by means of its coupling tooth 1111, is connected with the coupling tooth 2611 of the spur gear 26 which is rotatably supported with its two hub members in two bearing sleeves 32 and 33 which latter are secured by set screws 34 and 35 against axial displacement. The spur gear 26 is continuously in engagement with a relatively wide spur gear 36 which is rotatably mounted on a stub shaft 37 secured fixedly in a bore 414 of the carriage 4. The two annular end faces 415 and 3711 prevent an axial displacement of the spur gear 36. The latter is also in engagement with a spur gear 38 which is mounted for axial movement on a shaft 39 (Fig. 3). The hub of the gear 38 is provided with an annular guide groove 3811 and with a number of coupling teeth 3812 and the end face of the gear 38 opposite its hub is provided with a single coupling tooth 3813. The shaft 39 is rotatably mounted in the bearings 40 and 41 and carries in addition to the spur gear 38 a short sleeve 42 provided on its end facing the gear 38 with a coupling tooth 4211. Furthermore, two spur gears 43 and 44 are mounted on the shaft 39. The spur gear 44 is mounted non-rotatably and exchangeably on the outer end 3911 of the shaft 39. The gear 44 forms together with three other spur gears 45, 46 and 47 (Fig. 3) a change speed gear the ratio of which is selected according to the pitch of the grinding helix on the grinding worm 11 which is to be produced or dressed.

A lever 51 (Fig. 4) has attached thereto a pin 50 which carries rotatably a block 49 which is fitted in the annular groove 3811 of the gear 38. This lever 51 is fixedly attached to the inner end 5311 of a short shaft 53 which is rotatably mounted in a bearing 416 of the carriage 4. The outer end 5312 of the shaft 53 has fixedly attached thereto a similar lever 52 which also has rotatably attached thereto a block 54 by means of a pin 55. The block 54 engages a groove 5611 provided in a control piston 56 (Figs. 2, 5, 14, 15, 16).

A control ring 57 (Figs. 3, 5, 14, 15, 16) is rotatably mounted on the sleeve 42 and is secured against axial displacement by the annular end faces 4212 and 4011 (Fig. 3). The control ring 57 is provided with a radial bore 5711 (Figs. 5, 14, 15, 16) the outer end of which is closed by a screw plug 58. The bore 57 contains a helical spring 60 and a block 59 which latter is continuously urged by the spring 60 against the cylindrical surface of the sleeve 42. The control ring 57 is provided diametrically opposite of the radial bore 5711 with a slot-like recess 5712 extending at right angles to the shaft 39. In this recess is pivotally secured one end of a link 61 by means of a pin 63. The other end of the link 61 is connected pivotally by means of a pin 64 with a control piston 62 which is slidably mounted in the control block 19 transversely to other pistons 56, 74 and 76 therein.

The spur gear 43 is arranged between annular end faces 3912 and 415 (Fig. 3) and thereby is prevented from moving axially with respect to the shaft 39 on which it is loosely mounted. The gear 43 meshes continuously with a spur gear 48 and is provided on its end face directed toward the hub of the gear 38 with a number of coupling teeth 4312. The spur gear 48 and also the change speed gear 47 are keyed to a guide screw spindle 65. The latter has mounted thereon fixedly a sleeve 66. The end face 6611 of this sleeve 66 and the annular shoulder 6511 on the guide screw spindle prevent an axial displacement of the guide screw spindle 65, while the bore 67 forms a bearing for one end of the guide screw spindle 65. The portion of the guide screw spindle 65 to the right of an annular collar 6512 thereon is provided with a thread 6513 which is in threaded engagement with the interiorly threaded sleeve 68. The latter is axially slidable in a bore 70 provided in the carriage 4 and carries on its outer circumference a tongue 69 which prevents a rotation of the sleeve 68 in the carriage 4. The end face 6811 of the sleeve 68 has attached thereto a cover 71 (Figs. 1, 3 and 5) which is held in place by screws 712. An axial projection on the cover 71 is provided with a T-shaped groove 7111 (Figs. 2 and 3) and a laterally extending portion 72 of the cover 71 carries a control pin 73 which extends parallel to the axis of the guide screw spindle 65, is attached to the portion 72 at 7112 and projects into an axial bore 7411 (Figs. 14, 15 and 16) of the control piston 74. The piston 74 carries a transverse stop in the form of a screw 75 the inner cylindrical end 7511 of which projects into a longitudinal groove 7311 provided in the control pin 73.

The control block 19 (Figs. 2, 3 and 5) is attached to the rear wall of the grinding carriage 4 by four screws 75. The block 19 in addition to the already mentioned pistons 56, 62 and 74 also contains a main control piston 76 (Figs. 5, 14, 15, 16). The two opposite sides of the block 19 are provided with covers 77 and 78 (Fig. 3). The purpose and mode of operation of the four pistons 56, 62, 74 and 76 will be explained hereinafter in connection with the other control members.

*Feed mechanism*

The grinding carriage 4 is provided with two guide tracks 79 and 80 (Fig. 2) which extend at a right angle to the axis of the grinding wheel spindle 7 and carry a carriage 81 for moving the truing tools toward and away from the grinding worm 10. A piston 82 is arranged in a cylindrical bore 84 arranged in the carriage 4 (Fig. 8) between the two guide tracks 79 and 80. The piston 82 is provided on one end with a reduced shaft-like portion 821 which is slidably supported in a bore 85 (Fig. 8) which is in axial alinement with the bore 84. The bore 84 at the end facing the grinding worm 10 is closed by a cover 86. The reduced shaft-like portion 821 is provided with a central axial bore 822 and the outer circumference of the portion 821 has cut therein two longitudinal grooves 823 and 824. The outer end face of the shaft-like portion 821 has attached thereto a nut 87 by means of screws 88. The longitudinal groove 823 is in communication with a conduit 89 and is of such a length that only a small portion S extends into the annular chamber 841 when the piston 82 rests against the end face 861 of the cover 86. A set screw 90 (Fig. 8) is arranged in the grinding carriage 4 in such a manner to project with its inner end into the longitudinal groove 824 of the shaft-like portion 821 and thereby a rotation of the piston 82 is prevented. The nut 87 is in threaded engagement with a spindle 91 which is employed for adjusting the carriage 81 and carries non-rotatably thereon a spur gear 92. The outer end of the spindle 91 has a hand wheel 93 attached thereto. The spindle 91 is rotatably mounted in a bore 811 of the carriage 81 and is prevented from moving axially with respect to the carriage 81 by the annular end faces 931 and 911.

Figure 7:
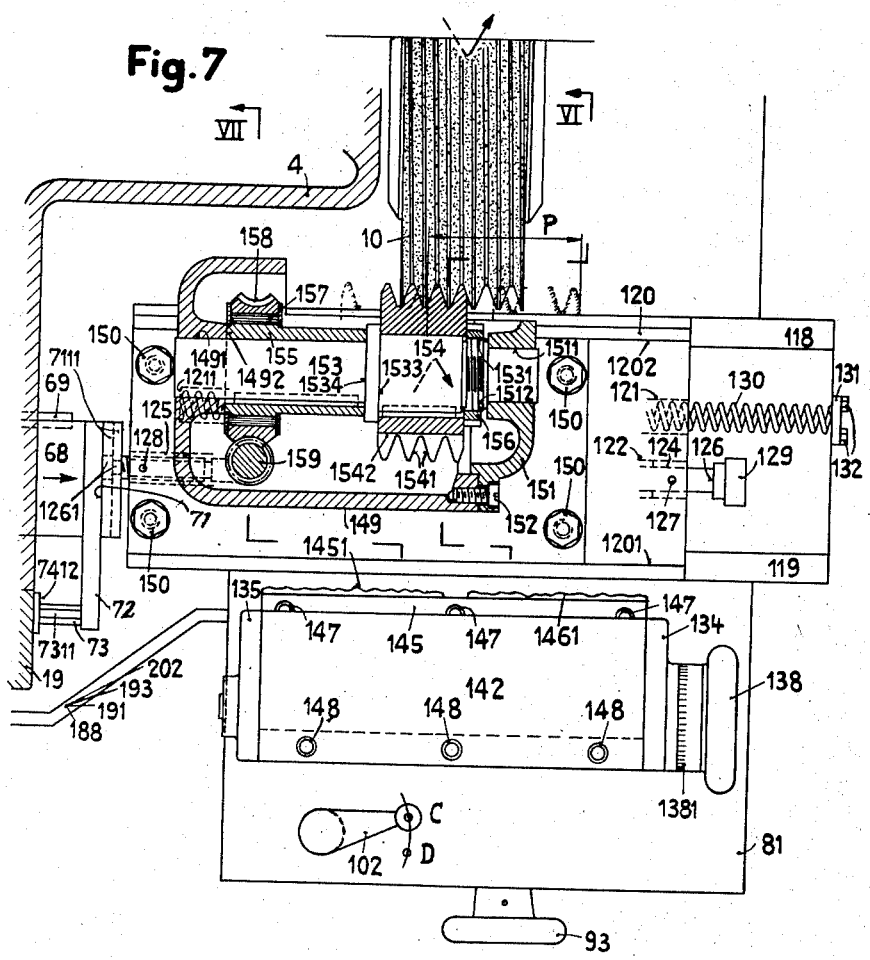
Fig. 7 is a plan view and a partial sectional view on the line V—V of Fig. 8 and illustrates a press roll device mounted on the grinding carriage.

The carriage 81 is also provided with an automatically operable feed spindle 94 (Figs. 2 and 9) which is arranged parallel to the manually operable feed spindle 91. The feed spindle 94 is rotatably mounted in a bore 812 of the carriage 81 and extends slidably through the bore 951 of a ratchet wheel 95 having a relatively long hub. The feed spindle 94 is secured against axial movement by its annular end face 941 and by a washer 96 secured by a screw 97 to the end of the spindle 94. A spur gear 98, which is axially movably mounted on the feed spindle 94, has a hub provided with an annular groove 981 into which a pin 99 extends which is attached to a lever 100. The lever 100 is attached to a short vertical shaft 101 rotatably mounted in a bore 813 of the carriage 81 and has on its upper end a handle 102. By rotatably adjusting the handle 102 it is possible to shift the spur gear 98 along the feed spindle 94. A rotation of the handle 102 causes a rotation of the shaft 101 and of the lever 100 so that the pin 99 thereon is adapted to be moved to two different positions C and D (Figs. 3, 8 and 9). In the position "C" the spur gear 98 meshes with the spur gear 92. This is the position, as will be described presently, when the truing roller device is in engagement with the grinding worm 10 and the feed movements are executed by the automatic feed device (Figs. 7, 8 and 9). The position D (Figs. 1 and 3) is selected when the diamond tools are used for dressing the grinding worm.

The feed spindle 94 is operatively connected with a ratchet device which includes the ratchet wheel 95 (Figs. 9 and 10), a feed wheel 103, a piston 104 and a spring 105. The ratchet wheel 95 is rotatably supported in a bore 106 of the carriage 4. The feed wheel 103 is rotatably supported on the long hub of the ratchet wheel 95 and is positioned between the annular faces 952 and 1061 (Fig. 9). An annular nut 107 attached to the outer end of the hub of the ratchet wheel 95 prevents axial displacements of the latter and of the feed wheel 103. The feed wheel 103 carries on a radial extension a pawl 108, a stop 109 and furthermore is provided with a gear segment 1031. The pawl 108 is arranged in a bore 1032 (Fig. 10) the outer end of which is closed by a cover 110. A spring 111 in the bore 1032 urges the pawl 108 continuously in engagement with the teeth of the ratchet wheel 95. The gear segment 1031 (Fig. 10) engages a rack bar 1041 on the piston 104. The piston 104 is axially slidably mounted in a vertical bore 114 both ends of which are closed by the covers 112 and 113. The piston 104 is provided with an axial bore 1042 in which is mounted a spring 105 which engages with one end the cover 112 and continuously urges the piston 104 upwardly. The chamber 1141 formed between the upper end of the piston 104 and the upper cover 113 communicates with the conduit 89 by means of the passage 115. The rotative movement of the feed wheel 103, or the so-called stroke of the piston 104 connected therewith, is determined by the position of the abutment screw 116. The latter is adjustably mounted in the grinding carriage 4 and is secured in the desired position by a lock nut 117. The operation of this feed device will be described presently in connection with the other control elements.

The carriage 81 is provided with two upper guide tracks 118 and 119 (Figs. 1, 8 and 9) which extend parallel to the axis of the grinding wheel spindle 7. The guide tracks 118 and 119 are used for slidably supporting a carriage 120 which is adapted to support selectively either the truing roller device or the diamond dressing device. The body of the carriage 120 is provided with two parallel lengthwise extending bores 121 and 122 (Figs. 3, 8 and 9). The bore 122 extends entirely through the carriage 120 and has mounted therein two axially alined sleeves 124 and 125 (Figs. 2, 3 and 7) which are secured by set screws 127 and 128 against rotation and axial displacement. The sleeve 125 has an interior thread which is in engagement with a screw spindle 126 while the other sleeve 124 serves solely as a guide for the non-threaded portion of the spindle 126. The left hand end 1261 of the screw spindle 126 (Figs. 2, 3 and 7) is shaped in such a manner with head and neck that it fits correctly and rotatably into the T-shaped groove 7111 provided in the axial projection of the cover 71. The right hand end 1262 of the screw spindle 126 has attached thereto an adjustment knob 129 (Fig. 3). The other longitudinal bore 121 in the carriage 120 does not extend entirely through the carriage but terminates before one end of the same as shown at 1211 (Figs. 3 and 7) which numeral indicates the bottom of the bore 121. The bore 121 has mounted therein a long helical spring 130, one end at which rests against the bottom 1211 and the other end projects outwardly from the bore and abuts against a plate 131 which is secured to the carriage 81 by screws 132 (Figs. 2, 3, and 7). The spring 130 continuously urges the carriage 120 to the left (Fig. 3).

The carriage 81 is provided with a raised center portion (Figs. 1, 2, 3, 8 and 9) which is used to support a device for controlling the diamond tools 164 and 165. This device comprises a spindle 133 (Fig. 3) provided with a left hand thread 1331 and a right hand thread 1332 and which is rotatably supported in plates 134 and 135 secured to the ends of the center portion by means of screws 136 and 137. One end 1335 of the spindle 133 projects outwardly from the plate 134 and carries fixedly thereon a hand wheel 138 provided on the circumference of its hub with a graduated scale 1381. A nut 139 is attached to the threaded end portion 1334 of the spindle 133 and urges the hand wheel 138 against the end face 1333 of the plate 134. The shoulders 1336 and 1382 prevent an axial displacement of the spindle 133. The two threaded portions 1331 and 1332 of the spindle 133 have mounted thereon adjusting blocks 140 and 141 respectively, which are fitted without any play between the upper cover 142 and the bottom face 814 of a recess formed in the raised center portion (Figs. 8 and 9). The sides 1401 and 1411 of the blocks 140, 141 facing the grinding worm 10 are provided with T-shaped tongues (Fig. 9) and, furthermore, these tongues are oppositely inclined with respect to a vertical plane extending through the axis of the spindle 133. The T-shaped tongues on the adjusting blocks 140 and 141 are in engagement with correspondingly formed inclined T-shaped grooves 143 and 144 which are formed on the side edges of two superimposed plates 145 and 146. These plates are held together by five screws 147 (Figs. 3, 8 and 9) and likewise are carefully fitted into the recess formed between the bottom face 814 and the cover 142. The cover 142 is held in position by screws 148 (Fig. 8).

Truing and dressing devices

The profile of the grinding worm 10 preformed or reconditioned by a roller device (Fig. 7) and for finishing the profile a diamond dressing device (Fig. 1) is used. Either one of these two devices may be mounted selectively between the guide shoulders 1201 and 1202 (Figs. 8 and 9) on the plane surface 1203 of the carriage 120.

The roller device (Figs. 7, 8 and 9) comprises a casing 149 which is adapted to be secured to the carriage 120 by four bolts and nuts 150. The casing 149 is closed at one end by a cover 151 (Fig. 7) which is held in place by a number of screws 152. A short and strong shaft 153 is rotatably mounted in bearings 1491 and 1511 provided in one end of the casing 149 and in the cover 151 respectively. The shaft 153 carries a press roll 154 and also has keyed thereto the inner annular member 155 of an overrunning clutch associated with a worm gear 158. The press roll 154 is provided with a plurality of annular grooves 1541. The profile of these grooves corresponds to the profile of the thread on the grinding worm 10. The walls of the grooves 1541 are provided with radial grooves 1542 (Fig. 8). The press roll 154 is held against an annular shoulder 1533 of the shaft 153 by a nut 156 which is screwed upon the threaded portion 1531 of the shaft 153. The annular member 155 of the overrunning clutch is mounted between the annular shoulders 1534 and 1492 (Fig. 7) and thereby is secured against axial displacement. In view of this construction it appears that the shaft 153 is held against axial displacement by the annular shoulders 1492 and 1512. The inner annular member 155 of the overrunning clutch carries a number of rollers 157 (Figs. 7 and 9) and also supports the worm wheel 158 which latter is in engagement with a worm 159. The arrangement of the rollers 157 is such that the same are adapted to establish a driving connection between the worm wheel 158 and the shaft 153 when the latter is at rest or rotates slower than the worm wheel 158. If, however, the shaft 153 is driven by the press roll 154 with a greater speed than the worm wheel 158 is driven then the rollers 157 become ineffective and the inner member 155 of the overrunning clutch overruns the slower rotating worm wheel 158. The worm 159 is attached to the end of an armature shaft of an electric motor 160 which is attached in vertical position by means of a flange to the casing 149 (Figs. 8 and 9). The number of revolutions of this motor 160 and the transmission ratio of the worm gearing 158, 159 is so selected that the circumferential speed of the press roll 154 driven by the same is a little below the smallest possible circumferential speed of the grinding worm 10, when the latter is driven with reduced speed by means of the electric motor 27, which latter drives the worm gearing 29, 30, the shaft 31, the spur gears 25, 11 and finally the spindle 7.

The diamond dressing device comprises two plates 162 and 163 (Figs. 1 and 3) which contain the guide grooves 1621 and 1631 for the two diamond tools 164 and 165. The lower plate 162 is secured fixedly by means of four screws 166 to the carriage 120 and is provided with two tongues 167 (Fig. 3) extending parallel to the guide tracks 118 and 119. The plate 163 is superimposed upon the plate 162 and is slidably fitted onto the tongues 167. The mating face between the two plates 162 and 163 is positioned in a horizontal plane which also passes through the axis of the grinding wheel spindle 7 (Figs. 1 and 3).

Figure 1:
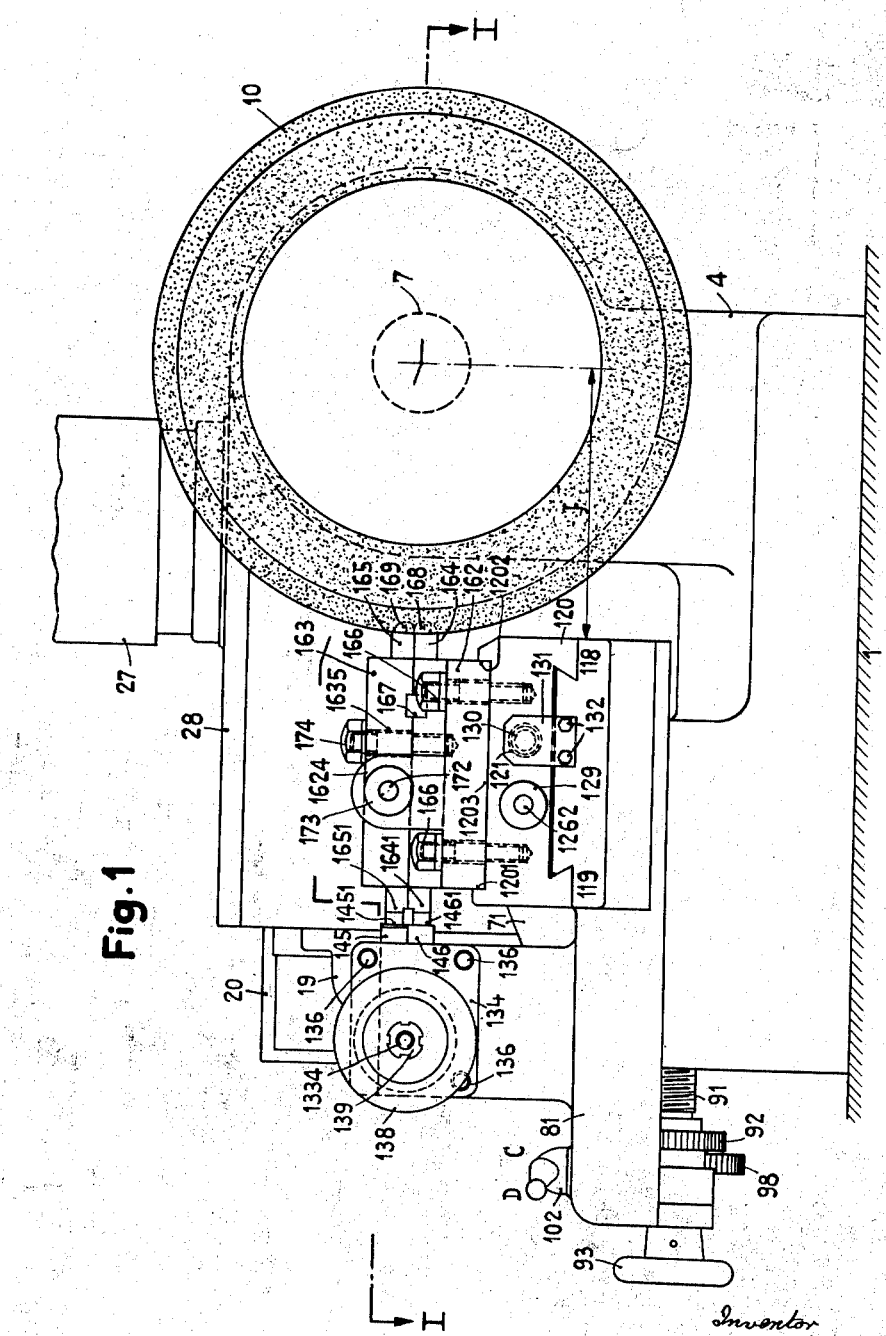
Fig. 1 is an end elevation view of a grinding carriage adapted for supporting thereon the devices for truing and dressing a grinding worm. This figure shows a non-rotatable dressing device provided with diamond tools mounted on the carriage.
Figure 6:
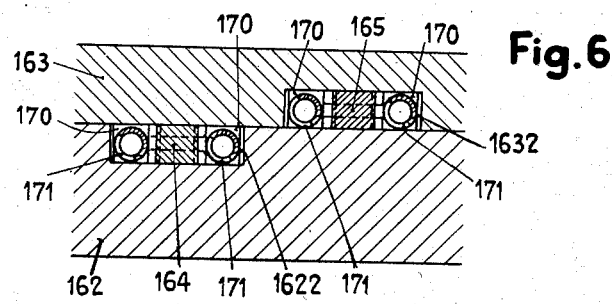
Fig. 6 is a cross sectional view through the diamond tools on the line IV—IV of Fig. 3.

The diamond tool 164 is arranged in the guide groove 1621 of the lower plate 162 (Figs. 1, 3 and 6). The groove 1621 extends parallel to the side L—M of the profile of the grinding worm 10. In similar manner the guide groove 1631 extending parallel to the other side N—O of the profile of the grinding worm 10 is arranged in the upper plate 163 and contains the diamond tool 165. Both diamond tools 164 and 165 have inserted at their front end a diamond 168 and 169 respectively. The diamonds 168 and 169 are in most cases somewhat narrower than the side L—M or N—O, but their cutting edge extends absolutely parallel to the guide of the holder or the respective side of the profile of the grinding worm 10. Both diamond tool holders are provided each with two spring supporting plates 170 which are riveted in position and which are arranged in recesses 1622 and 1632 of the plates 162 and 163 respectively. Pressure springs 171 are arranged between the side walls 1623 and 1633 of the two recesses 1622 and 1632 respectively, and the plates 170. The pressure springs 171 are effective to press the points 1641 and 1651 of the two diamond tools 164 and 165 always without play against the control faces 1461 and 1451 of the plates 146 and 145 respectively.

For the adjustment of the diamonds 168 and 169 (Fig. 3) the upper plate 163 may be moved along the tongues 167. For this purpose the plate 163 is provided with two oblong holes or slots 1635 and with a threaded socket 1634 into which is screwed an adjustment spindle 172. The latter is rotatably supported by a projection 1624 extending upwardly from one end of the lower plate 162 (Figs. 1 and 3). The adjustment spindle 172 carries on its outer end an adjustment knob 173 and two shoulders 1731 and 1721 prevent an axial displacement of the adjustment spindle 172 in the projection 1624. The plate 163 is held in position by the two screws 174 passing through the slots 1635.

*Operation and functions of the control members*

In the following the operation of the truing and dressing devices and the functions of control members are described in succession and the manner of producing and dressing the profile of the grinding worm 10 will be explained.

When a new grinding disc having a cylindrical outer surface is to be subjected to the roller device or when a grinding worm having a defective or worm profile is to be reconditioned the following operating conditions are to be established:

The lever 15 should be in the position A so that the spur gears 11 and 25 (Figs. 3 and 4) are in mesh with each other. The handle 102 should be in the position C (Figs. 7, 8 and 9) so that the spur gears 92 and 98 are in mesh with each other.

The roller device is mounted on the carriage 120. Furthermore, for the sake of discussion it will be assumed that the control elements of the press roll are in the position as disclosed in Fig. 14. The electric motor 27 drives by means of the worm gearing 29 and 30 the shaft 31, which latter drives the spur gears 25 and 11 so that the grinding wheel spindle 7 is rotated since it is connected by the key 161 with the gear 11. Therefore, the grinding worm 10 is rotated with a reduced speed as intended for the truning and dressing operation. Further, the spur gear 11 by means of the one tooth clutch 1111 and 2611 (Fig. 3) drives the spur gears 26, 36 and 38. The one tooth clutch 3813 and 4211 drives the sleeve 42 and therewith the shaft 39 because the latter is connected by the key 175 with the sleeve 42. The shaft 39 drives by means of the change speed gearing 44 to 47, the ratio of which has been selected according to the pitch angle of the grinding worm 10, the guide screw spindle 65, and the latter rotates in the direction indicated by the arrow in Fig. 3. The spur gear 48 keyed to the guide screw spindle 65 drives the spur gear 43 which in this instance rotates idly on the shaft 39.

The rotation of guide screw spindle 65 causes an axial displacement of the sleeve 68 which is in threaded engagement with the guide screw spindle 65 but is prevented from rotating by the tongue 69. The sleeve 68 moves axially toward the right and thereby moves also the parts 71 and 73 toward the right because these parts are connected with the sleeve 68 (Fig. 3). This longitudinal movement is also transmitted to the screw 126 whose shoulder 1263 is continuously in engagement with the cover 71 and thereby the carriage 120 connected with the screw 126 is moved toward the right and in this manner the roller device which is mounted on the carriage 120 is also moved toward the right.

It is assumed that the press roll 154 is in engagement with the grinding worm 10 as shown in Fig. 7. The grinding worm 10 in this particular operating condition acts as drive member for the press roll 154 and the circumferential speed of the press roll 154 and of the grinding worm 10 are therefore alike. As already explained previously the number of revolutions of the shaft 153 will be greater than the number of revolutions which would be transmitted to the shaft 153 by the electric motor 160 and the worm gearing 158, 159. Therefore, the overrunning clutch 155, 157 between the shaft 153 and the worm wheel 158 is inoperative, that is, the inner member 155 overruns freely the outer member consisting of the worm wheel 158.

Figure 14:
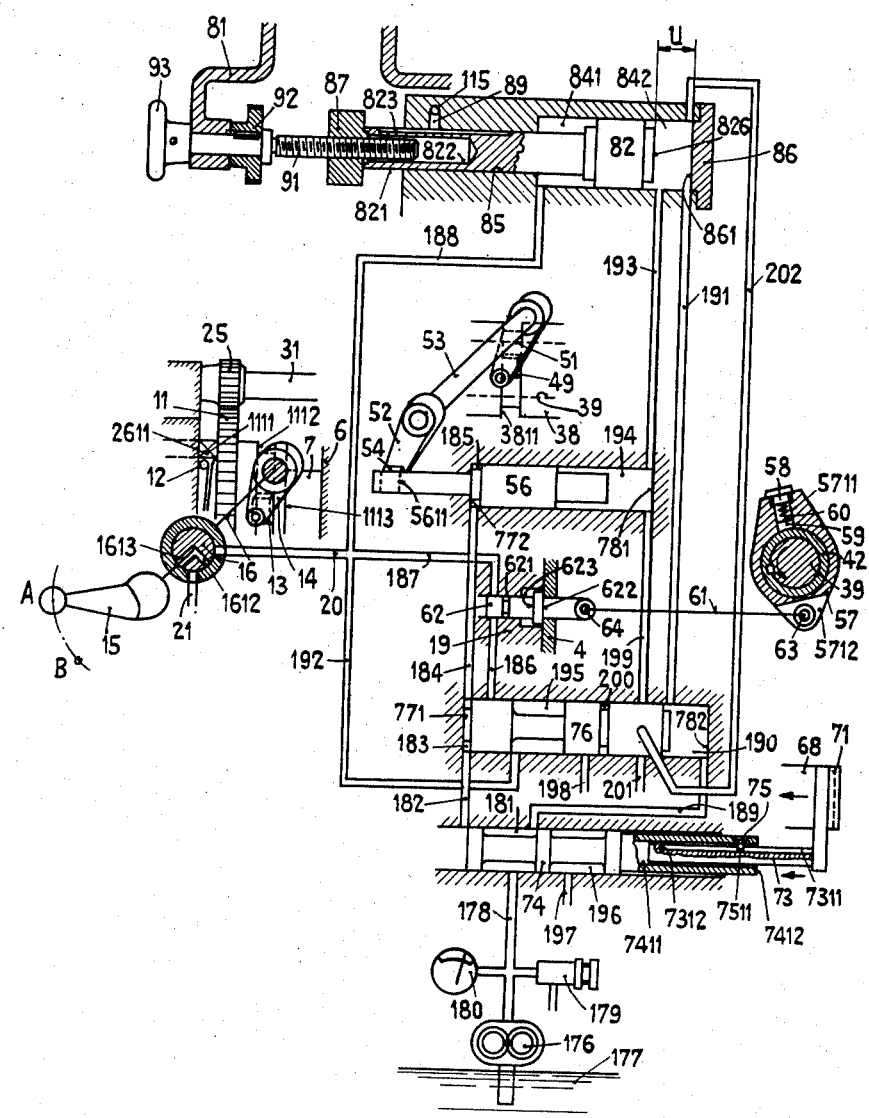
Fig. 14 is a diagrammatic illustration of the hydraulic control device when the truing tool executes its return pass and, Fig. 15 is a diagrammatic illustration of the hydraulic control device when the truing tool is inoperative.

The pressure fluid employed for controlling the truing and dressing devices is supplied by a gear pump 176 (Fig. 14) which draws the fluid from a sump 177 and conveys it into the pressure line 178. The required pressure is adjusted by means of the pressure regulating valve 179 and is indicated by the pressure indicator 180. The sump 177 and the parts 176, 178, 179 and 180 are preferably arranged in the base of the machine frame 3. The pressure fluid enters the chamber 181 of the control block 19 and from here enters the conduit 182 and is conducted to the cylindrical chamber 183 in which the piston 76 is slidably mounted. The piston 76 is maintained by the pressure fluid in its right hand end position. From the chamber 183 the pressure fluid enters the line 184 and the chamber 185, so that the piston 56 is pressed against the end face 781 (Fig. 14). The lever 52 whose position is controlled by the piston 56 in this operating condition points toward the right. The lever 52 which is attached to the shaft 53, therefore, also holds the lever 51 connected with the shaft 53 toward the right in which position the block 49 on the lever 51 and which extends into the annular groove 3811 of the spur gear 38 holds the latter in the right hand end position in which the one tooth clutch 4211, 3813 is maintained in operative position. The result is that the above described driving connection of the guide screw spindle 65 is maintained. Another line 186 conducts pressure fluid from the chamber 183 into the annular groove 621 of the piston 62 and from there into the line 187 and 188 so that pressure fluid enters the chamber 841 of the feed device. Therefore, the piston 82 is moved toward the right (Figs. 8 and 14) and the press roller 154 is urged against the grinding worm 10 because the piston 82 is operatively connected by means of the spindle 91 and the hand wheel 93 with the carriage 81 on which the roller device is mounted (Figs. 1, 8 and 14). When the distance between the piston 82 and the end face 861 (Fig. 8) is smaller than the predetermined distance T the pressure fluid can enter the chamber 1141 by means of the crack S, the groove 823 and the two passages 89 and 115. The piston 104 (Fig. 10) will then be urged continuously downwardly and its end face 1043 engages the cover 112. Accordingly, the rack 1041 holds the feed wheel 103 by means of the gear segment 1031 in that extreme end position in which the stop 109 is spaced from the abutment 166 a distance which is equal to the adjusted angle $\varphi$.

If, however, the distance between the end faces 861 and 826 is larger than the crack T then there is no communication between the chamber 841 and the groove 823. This condition occurs when the depth of the profile produced by the press roll 154 on the grinding worm 10 is smaller than the distance the roll 154 has been fed. When the automatically executed feed movements under these conditions would continue without interruption the possibility would exist that the difference between the produced depth of the profile and the feed movement would increase. When this would happen it would mean that certain damages would be produced because the press roll 154 would be able to enter into the grinding worm at various places with a different degree of depth, particularly when the material of the grinding worm is not of uniform hardness, and there would be produced a defective profile which is not uniformly round. The construction as proposed in the present invention, however, prevents such errors, because the automatic feed mechanism can only become active when the crack between the end faces 861 and 826 is smaller than the predetermined small distance T.

The travel of the carriage 120 from the left hand side toward the right hand side, or in other words the working pass of the press roll 154 upon the grinding worm 10 continues until the end 7312 (Fig. 14) of the groove 7311 engages the inner end 7511 of the screw 75, whereupon the piston 74 is likewise moved toward the right. The pressure fluid now flows from the chamber 181 into the passage 189 and into the chamber 190. The result is that the piston 76 is moved toward the left until it engages the end face 771. The fluid in the chamber 183 drains into the sump 177 over the passage 182 which has been disconnected from the line 170 by the just mentioned movement of the piston 74. In the left end position of the piston 76 the pressure fluid in the chamber 190 enters by means of the passage 191 the chamber 842 and moves the piston 82 therein rearwardly, that is toward the left hand side. This has the result that the press roll 154 is moved away from the grinding worm 10. The radial movement of the press roll 154 away from the grinding worm 10 is of a predetermined distance and is discontinued when the fluid expelled from the chamber 841 into the passages 188 and 192 has filled the empty chamber 195. The volume of the chamber 195 is so selected that the truing and dressing tools, namely the press roller 154 or the diamonds as the case may be, are moved completely out of the range of the grinding worm 10. The stroke U (Fig. 13) of the piston 82 is somewhat larger than the largest possible depth "a" of the profile. Shortly before the piston 82 has completed its stroke U the pressure fluid from chamber 842 enters the passage 193 and the chamber 194. The piston 56 moves toward the left until it engages the end face 772 (Fig. 14). The fluid in the chamber 185 is expelled into the passage 184, the chamber 183 and the passage 182. During the travel of the piston 56 toward the left the lever 52 which with its block 54 engages the groove 5611 is moved in clockwise direction and thereby the shaft 53 carrying the lever 52 and the lever 51 are also rotated in the same direction. This causes a movement of the spur gear 38 toward the left because the block 49 engages the groove 3811 of the spur gear 38. This has the result that the one tooth clutch 4211 and 3813 is disengaged and that the tooth clutch 3812 and 4312 is engaged (Fig. 3). The guide screw spindle 65 now is no longer driven by the one tooth clutch 4211 and 3813, the sleeve 42, the tongue 175, the shaft 39 and the change speed gear 44—47, but the guide screw spindle 65 is now driven by the spur gear 38, the tooth clutch 3812 and 4312 and the spur gears 43 and 48. At the same time the direction of rotation of the guide screw spindle 65 is reversed and its number of revolutions is substantially greater than during the previous working pass of the carriage 120. Accordingly, the sleeve 68, the cover 71 and the control pin 73 mounted thereon are moved toward the left. Furthermore, the carriage 120 and the roller device mounted thereon is moved with increased speed under the action of the spring 130 also toward the left and this constitutes the return pass of the roller device. When the press roll 154 becomes disengaged from the grinding worm 10 the number of revolutions of the shaft 153 decreases. As soon as the number of revolutions is substantially equal to the number of revolutions of the worm wheel 158 which is driven by the electric motor 160, which motor is continuously in operation during the use of the roller device, the overrunning clutch becomes effective and the worm gear 158, 159 takes over the drive of the shaft 153.

Figure 15:
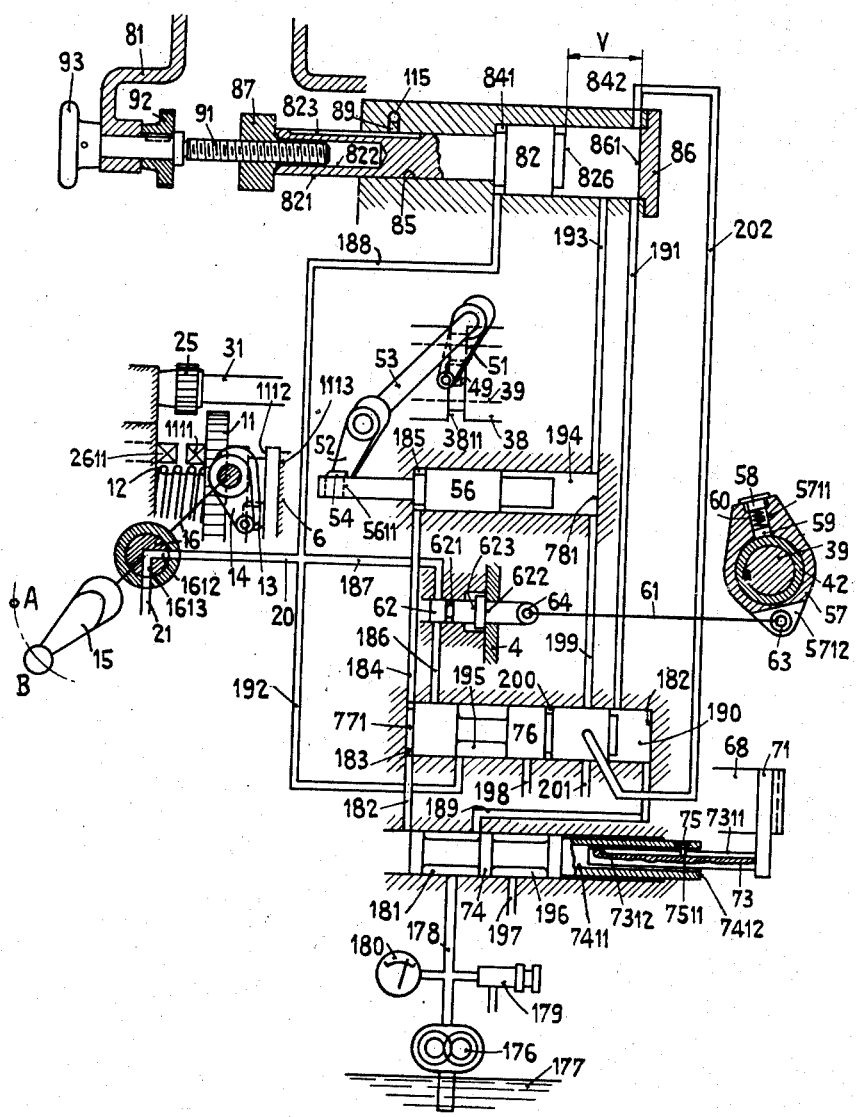

During the return travel of the carriage 120 with the press roll 154 thereon the guide screw spindle 65 drives by means of the change speed gear 47, 46, 45 and 44 the shaft 39 and the sleeve 42 mounted on the latter. The direction of rotation, however, is reversed from the direction of rotation which the shaft 39 has during the working pass of the carriage 120. Therefore, the sleeve 42 causes now a rotation of the control ring 57 mounted thereon in counterclockwise direction in view of the fact that the spring 60 urges the block 59 slightly against the surface of the sleeve 42. This causes a shifting of the linkage 61, 63 and 64 and of the piston 62 connected therewith toward the right, namely from the position shown in Fig. 14 to the position shown in Fig. 15 or 16. As soon as the end face 622 of the piston 62 engages the outer wall of the carriage 4 the communication between passages 186 and 187 is interrupted (Fig. 15) and a further rotation of the control ring 57 is impossible and the latter remains in its new position as shown in Fig. 15 as long as the shaft 39 and the sleeve 42 continue to rotate in this reverse direction.

When the press roll 154 is moved away from the grinding worm 10, namely when the piston 82 (Fig. 8) moves toward the left (Fig. 8) the communication between the groove 823 and the chamber 841 is at once interrupted. However, the other end of the groove 823 is connected with the atmosphere. Under the action of the spring 105 (Fig. 10) the piston 104 will now be moved upwardly and expels the fluid from the chamber 1141 through the passages 115 and 89 and the groove 823 into the atmosphere, so that the fluid can drain into the sump 177. The rack 1041 rotates by means of the tooth segment 1031, the feed wheel 103 counterclockwise about the adjusted angle $\varphi$, that is, until the stop 109 engages the abutment screw 116. The pawl 108 which is under the action of the spring 111 transmits during the above mentioned rotation of the feed wheel 103 the movement of the latter to the ratchet wheel 95. The latter is connected with the shaft 94 by the tongue 953 and the latter rotates the two spur gears 98 and 92 (Figs. 8 and 9) which latter is mounted on the spindle 91 provided the gears 98 and 92 are in mesh with each other which is the case as long as the lever 102 is in position C. The spindle 91 is provided with a, right handed thread and rotates during this phase of operation clockwise which results in a feed movement of the carriage 81 during which the press roll 154 is moved a step toward the grinding worm 10.

At the end of the return pass of the carriage 120 the cover 71 engages the end face 7412 of the piston 74 and moves the latter toward the left into its original position (Fig. 14). Now pressure fluid again flows from the chamber 181 into the passage 182 and into the chamber 183 and moves the piston 76 toward the right until it engages the end face 782 (Fig. 14). The fluid in chamber 190 is expelled into the passage 189, the chamber 196 and from here drains through the passage 197 into the sump 177. At the same time the chamber 195 is emptied over the passage 198 which conducts the fluid into the sump 177.

At the same time pressure fluid from the chamber 183 is forced over the passage 184 into the chamber 185 and causes the piston 56 to move toward the right until it engages the end face 781. This action takes place immediately after the piston 74 has been reversed and has reached the position shown in Fig. 14. When the piston 56 moves toward the right the fluid in the chamber 194 is expelled over the passage 199 into the annular groove 200 in the piston 76 into the passage 201 which drains the fluid quickly into the sump 177. This is accompanied by a counterclockwise rotation of the two levers 52 and 51 which are attached to the shaft 53 and the spur gear 38 is moved again toward the right (Fig. 3) so that the tooth coupling 3812 and 4312 is disengaged. The return drive is thereby immediately interrupted, however, the one tooth coupling 3813 and 4211 is engaged almost immediately and the working pass is started again. The drive of the guide screw spindle 65 takes place again in the same manner as previously described, namely by means of the spur gear 38, the one tooth coupling 3813 and 4211, the sleeve 42, the key 175, the shaft 39 and the four change speed gears 44 to 47 inclusive. In view of the change of direction of rotation the sleeve 68, the cover 71, the control pin 73 and the carriage 120 are again moved toward the right in their working pass.

As soon as the piston 76 reaches its right hand end position (Fig. 14) the passage 186 is connected with the chamber 183, but the pressure fluid entering the passage 186 in this position of the elements is unable to enter the passage 187 because the piston 62 still is held in its right hand end position (Fig. 15) and blocks the passage of the pressure fluid. The movement of the piston 62 toward the left takes place only after the one tooth coupling 3813 and 4211 has become engaged and has rotated the shaft 39 in a direction in which the carriage 120 travels toward the right. Only after the carriage 120 has already moved a small distance toward the right will the sleeve 42 become effective to rotate the control ring 57 mounted thereon in clockwise direction so that the linkage 61, 63 and 64 is able to move the piston 62 connected therewith toward the left, until the annular shoulder 623 engages the control block 19. As soon as this has taken place the pressure fluid in the passage 186 can again enter the annular groove 621 which establishes a communication between the passages 186 and 187 and then the pressure fluid can flow into the passage 188 and into the chamber 841 to move the piston 82 toward the grinding worm 10 until the press roll 154 engages the latter. The fluid in the chamber 842 is expelled into the passage 202 and into the annular groove 200 and from here reaches the drain passage 201 to be returned to the sump 177. From this point on the control system is again in the condition as shown in Fig. 14 and operates as previously described.

This operating cycle continues until the desired depth $a$ of the profile has been reached. All the operations described may be diagrammatically illustrated by means of a closed diagram as illustrated in Fig. 13.

Figure 13:
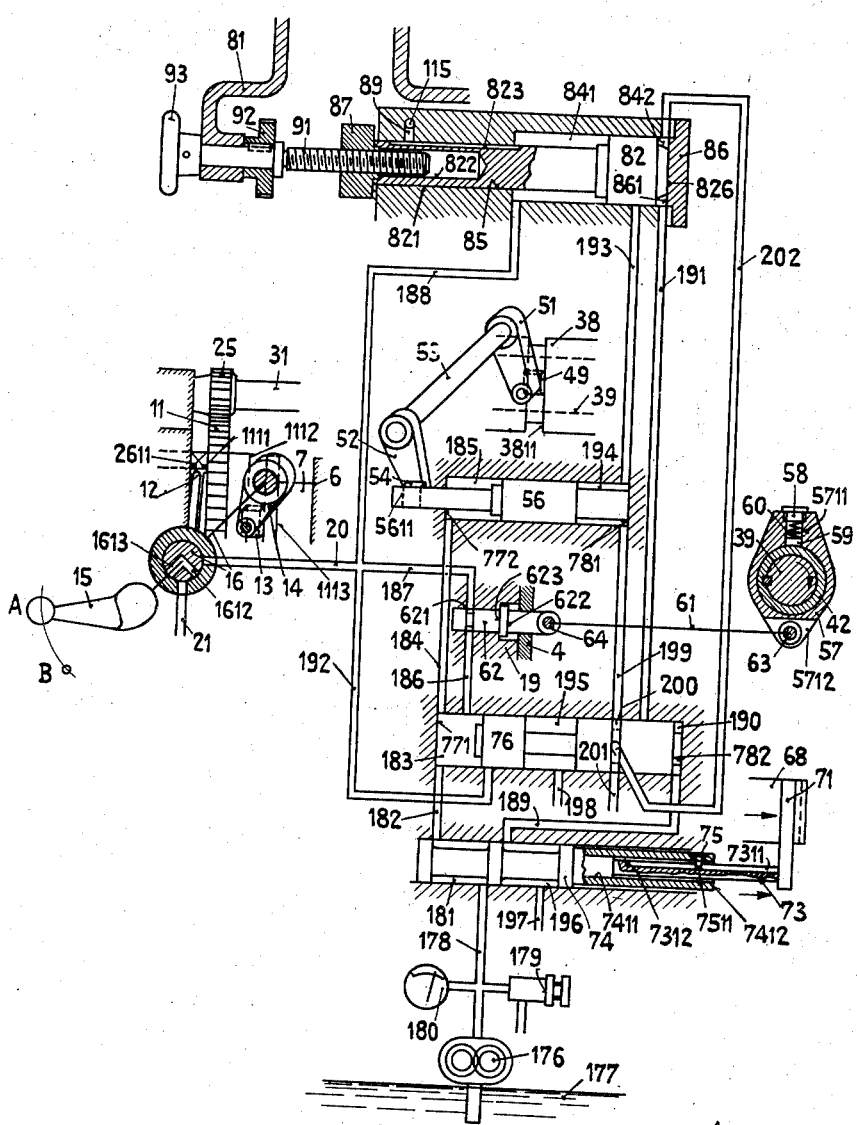
Fig. 13 is a diagrammatic illustration of the hydraulic control device when the truing tool performs its working pass.

In Fig. 13 the distance E—F illustrates the effective working pass P of the press roll 154 during which the latter is in engagement with the rotating grinding worm 10. The grinding worm 10 determines the number of revolutions of the press roll 154 during this period and as previously described the overrun clutch 155, 157 is inoperative as long as the press roll 154 rotates faster than the outer portion of the overrunning clutch consisting of the worm wheel 158 which is driven continuously by the electric motor 160. In this phase of operation the control system is in the position shown in Fig. 14.

At the point F of Fig. 13 the piston 82 and therewith the press roller 154 is moved away from the grinding worm 10. The carriage 120, however, continues to travel in its working pass direction toward the right. Only after the radial return movement F—G, namely the stroke U of piston 82 has been completed and the press roller 154 has been completely moved out of the range of the grinding worm 10 the return pass starts at the point H. The return pass takes place with increased speed toward the left, namely during the distance H—I. During this time the automatic feed adjusting device becomes operative and the feed spindle 91 is rotated one step. During this time the press roll 154 will be positively driven by means of the engaged overrun clutch 155, 157 from the electric motor 160. During this phase of operation the position of the elements in the control system is as shown in Fig. 15.

At the end of the return travel, namely at the point I the carriage 120 again is caused to move toward the right. However, only after it has moved a predetermined distance in this working stroke the feed movement of the carriage 81 is started at the point K and is completed at the point E. This distance K—E denotes the stroke U of the piston 82. From this point on the press roll 154 is again in engagement with the grinding worm 10. The number of revolutions of the press roller 154 will be somewhat higher than the number of revolutions which the motor 160 and the worm gear 158, 159 is able to transmit to the press roll 154. Therefore, the overrunning clutch is rendered ineffective at the point E, that is to say, the inner member 155 of the overrunning clutch rotates faster than the outer member 158 and the clutch rollers 157 are ineffective. Since the circumferential speed of the press roll 154 before the point E is only a small amount smaller than the circumferential speed of the grinding worm 10, owing to the fact that the electric motor 160 drives the press roll 154, it will only be necessary to supply a small amount of accelerating energy at the point E in order to bring the press roll 154 to the same speed as the grinding worm 10. If the motor 160 would not have been provided the press roll 154 would almost have no speed at all after it has completed its return pass from point H to I and it would be necessary to accelerate the press roll 154 at the point E from about zero to the circumferential speed of the grinding worm 10. A considerable shock would be exerted when the rotating grinding worm 10 engages the substantially nonrotating roll 154 and such a shock would influence very detrimentally the quality of the profile to be produced. Not only would it be necessary to supply a considerable amount of acceleration energy in order to bring the press roll 154 to the desired speed, but the considerable amount of friction produced thereby would cause a substantial wear of the press roll 154. Since, however, the present invention provides an electric motor for driving the press roll 154 before it engages the grinding worm 10 any detrimental actions are reduced to a minimum and it is possible to produce very accurate and uniform profiles on the grinding worm and the press roll which is employed will have a very long life.

The disclosed arrangement of the control members and the selected succession of the control movements permit the employment of very effective press rolls having a plurality of annular ridges. It is not necessary to make the working pass of the carriage 120 so long that the relatively wide press roll 154 at the beginning and at the end of its working pass which is indicated by the distance E—F comes completely out of lateral engagement with the grinding worm 10. But as shown, it is only necessary that one end of the press roll 154 be arranged to extend somewhat from either end of the grinding worm 10. In the illustrated embodiment of the invention the carriage 120 is able to effect a complete working stroke P within the distance E—F (Fig. 13). One end portion of the press roll 154 will engage the grinding worm 10 at the point E and at the point F the press roller 154 will be moved radially away from the grinding worm 10 before the entire press roll 154 has moved laterally or axially away from the grinding worm 10.

When the rolling operation in which the press roll 154 engages the grinding worm 10 has to be interrupted or for any other reason has to be terminated, for instance, when the desired depth a of the profile has been reached it is advisable to move the lever 15 into the position B during the return travel of the carriage 120 (Fig. 15), that is, during the operating phase H—I (Fig. 13). When this is done the shaft 16, the lever 14 and the block 13 in the groove 1112 of the hub of spur gear 11 causes a shifting of the latter until its annular shoulder 1113 engages the sleeve 6 (Fig. 3). In this position the spur gears 11 and 25 are disengaged from each other and, furthermore, the one tooth coupling 1111 and 2611 is disengaged. The result is that the grinding wheel spindle 7, the grinding worm 10 and the carriage 120 are stopped at once.

There is established, however, now a communication of the passages 188, 192 and 20 and the two radial passages 1612 and 1613 (Fig. 16) in the shaft 16 with the drain passage 21. As is apparent from the Figs. 15 and 16 the chamber 842 during the return travel of the carriage 120 is always under fluid pressure and the piston 82 moves toward the left. Under these new conditions which are the result of moving the lever 15 into the position B all of the fluid in the chamber 841 may drain directly into the sump 177 by means of the passages 188, 20, 1612, 1613 and 21. The quantity of the fluid expelled from chamber 841 is now no longer limited by the capacity of chamber 195 and the piston 82, therefore, does not only move a distance U (Fig. 15) but moves the entire distance which is available to it and which is designated with V in Fig. 16. When this happens there will be produced a greater distance between the grinding worm 10 and the press roll 154 so that an exchange of the truing and dressing device may take place without difficulty. If, however, the grinding worm 10 is to be again worked upon by the press roll 154, then it will be necessary to move the lever 15 again into the position A. This causes an engagement of the two spur gears 25 and 11. Since now the carriage 120 was stopped between the points H and I the carriage, upon reconnection of the driving mechanism, will continue its travel toward the left. At the point I it starts in the manner described its travel toward the right. At the point K the piston 82 executes its radial feed movement, but it should be realized that at this time the piston 82 does not only move a distance U but it moves the total stroke V. All other functions will now be repeated without change as already described.

After the rolling of the grinding worm 10 has been completed it will be necessary to dress the sides of the grinding worm helix with the diamonds 168, 169 so that all and any inaccuracies in the profile may be removed.

For this purpose the press roll device is removed from the carriage 120 and the diamond dressing device is attached in place thereof on the carriage 120 and is secured in position by the screws 166 (Fig. 3). Since it will not be necessary to rotate the spindle 91 during the diamond dressing operation the hand lever 102 is moved into the position D. This adjustment of the hand lever 102 has the result that the lever 100, and the pin 99 which engages the groove 981 displaces the spur gear 98 a sufficient distance that it no longer meshes with the spur gear 92. Therefore, any feed steps which the piston 104 transmits to the feed wheel 103 and the ratchet wheel 95 on the shaft 94 are no longer transmitted to the spindle 91.

The control movements during the dressing of the diamonds take place in the same cycle as during the operation of the press roller 154. The working pass, return pass with increased speed, radial feed and radial return movements take place as shown in Fig. 13. The functions of the control system which take place are known from the previous description. The only difference is that the automatic feed adjusting device 94, 95 and 103 to 111 is inoperative. The end face 826 of the piston 82, therefore, is always in engagement with the end face 861 of the cover 86 when the carriage 120 executes its working pass designated by E—F in Fig. 13. During this working pass the diamonds 168 and 169 engage the sides L—M and N—O of the grinding worm helix.

The depth $a$ (Fig. 11) of the profie produced with the press roller 154 is selected somewhat greater than the depth $b$ which is dressed by the diamonds 168, 169. This has the advantage that the diamonds 168 and 169 do not have to engage the bottom of the profile and thereby damage to the diamonds is prevented. However, the distance $b$ is preferably somewhat greater than the depth $c$ which is absolutely necessary for the grinding of gears.

Since the width $d$ of the cutting edges of the diamonds in most cases is smaller than the entire side of the grinding worm to be dressed it is, of course, impossible to dress the grinding worm in a single pass and obviously it is necessary to provide a number of passes during which the dressing of the grinding worm is completed. During each pass there is, for instance, dressed a narrow zone on the side of the grinding worm helix which is designated in Fig. 11 with $e$. In order that all portions of the sides are dressed smoothly by the diamonds 168 and 169 the dimension $e$ is selected so that it is smaller than the width $d$ of the cutting edge of the diamonds.

Figure 11:
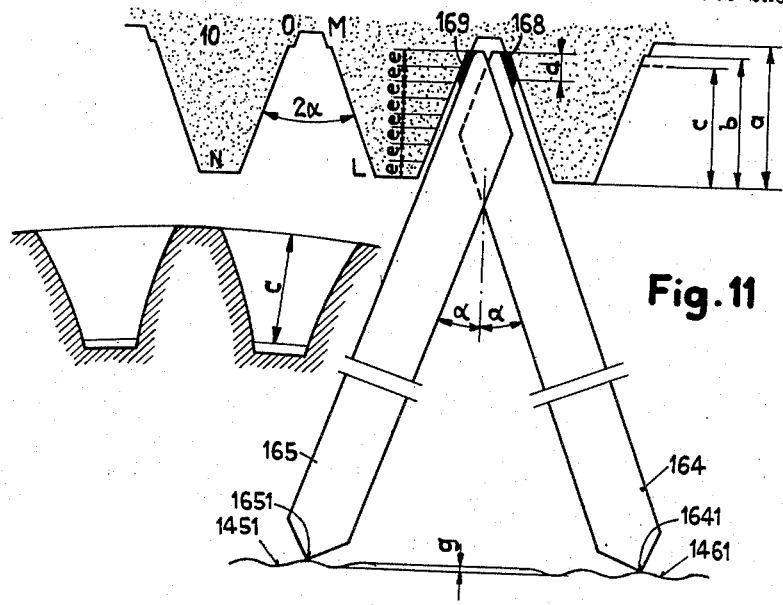
Fig. 11 is a diagrammatic illustration of the operation of the diamond tools during the dressing of a grinding worm employed for standard gear teeth.
Figure 12:
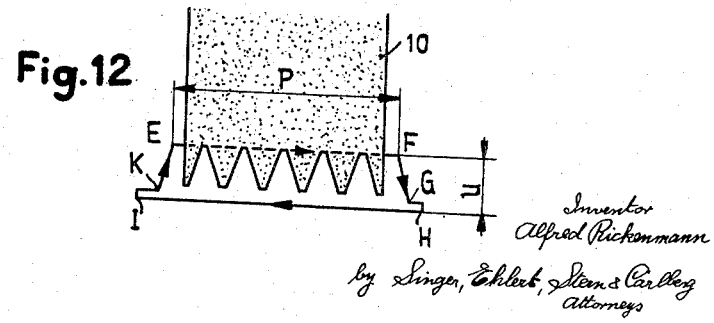
Fig. 12 is a diagrammatic illustration of the operation of the grinding machine when the press roller is used for preshaping or reconditioning of the grinding worm.

The diamond dressing device is mounted upon the carriage 120 in such a manner that the point 1641 of the lower diamond tool 164 engages continuously the edge face 1461 of the lower plate 164 while the point 1651 of the upper diamond tool 165 engages the edge face 1451 of the upper plate 154 (Figs. 3 and 11).

During a working pass, that is, when the carriage 120 moves from left toward the right and when in the control system the conditions are present as illustrated in Fig. 14 both diamonds 168 and 169, which have been adjusted by means of the adjusting screws 129 and 173, engage the corresponding sides of the grinding worm helix parallel to the axis of the grinding worm. The two points 1641 and 1651 slide along the edge faces 1451 and 1461. Between the carriage 81 and the axis of the grinding worm exists in this movement a distance $f$. At the end of the stroke P the diamond tools are radially removed from the grinding worm, namely during the stroke U of the piston 82. As soon as this step is completed the carriage 120 executes its return pass from right to left.

During this return pass (Fig. 11) the diamond tools 164 and 165 with the diamonds 168 and 169 are advanced a distance $e$, so that the same during their following working pass engage an additional side portion of the worm helix located somewhat a step deeper in the groove. For this purpose the operator of the machine rotates the hand wheel 138 (Figs. 3 and 7) a distance which corresponds to the desired feed distance $e$. This adjustment takes place by rotating the hand wheel 138 in clockwise direction whereby the desired distance of rotation can be read off on the scale 1381. This rotative movement of the hand wheel 138 is transmitted to the spindle 133 and to the right hand thread 1332 and to the left hand thread 1331 thereon. The adjustment blocks 141 and 140 which are in threaded engagement with the mentioned right hand and left hand threads respectively, are moved toward each other and thereby the two inclined guides 1401 and 1411 move the plates 145 and 146 connected therewith closer against the grinding worm 10. The two diamond tools 164 and 165 are, therefore, longitudinally displaced in their guides 1621 and 1631. Since the latter form between their longitudinal axes an angle of $2a$ and furthermore, since they are arranged parallel to the sides L—M and N—O of the grinding worm profile the diamonds are only moved sufficiently closer to each other as is necessary for operating on the grinding worm 10 at a position which is determined by the increased depth which corresponds to the distance $e$. At the end of the return pass the movement of the carriage 120 will be reversed, at the point I and as soon as the carriage has started its working pass toward the right a radial feed movement is executed by the hydraulic control system at the point K (Fig. 13) and the diamonds 168 and 169 are moved into working position and pass again along the helix of the grinding worm 110.

The position of the carriage 81 is exactly the same as during the previous working passages, the distance $f$ remains unchanged. However, the diamonds 168 and 169 have been adjusted relative to the previous working pass, namely they have been advanced toward the axis of the grinding worm 10 a predetermined distance $e$ and, therefore, they dress the grinding worm profile at a greater depth.

This working operation is repeated until both sides L—M and N—O have been dressed to the desired depth $b$ (Fig. 11).

Preferably, the edge faces 1451 and 1461 are not plane but have a slightly wavy shape as shown in Fig. 11. Therefore, the diamond tools when they slide along these wavy faces 1451 and 1461 are actuated to perform quick oscillating movements with a small amplitude $g$. This amplitude is transmitted to the diamonds 168 and 169. In view of this expedient diamonds 168 and 169 may be used whose cutting edges may have small defects or errors because the rapid back and forth movements of the diamonds prevent that the inaccuracy or defects of the cutting edges are transmitted to the sides of the grinding worm helix.

Furthermore, it has been discovered that the diamonds under these conditions have a very favorable cutting capacity and a longer life.

What I claim as my invention is:

1. In a device for truing grinding worms for gear grinding machines, a frame, a spindle rotatably mounted in said frame, means for securing said worm on said spindle, means for rotating said spindle continuously in one direction, a leading screw rotatably mounted in said frame parallel with said spindle, means operatively connecting said leading screw with said spindle for rotating said leading screw in dependence of said spindle, means reversing the direction of rotation of said leading screw, a non-rotatable nut in engagement with said leading screw, a carriage slidably mounted in said frame for movement parallel to said spindle, means connecting said carriage with said nut, a truing tool mounted on said carriage, means for moving said carriage toward and from the periphery of said worm in a direction perpendicular to said spindle, and means operatively connected with said nut for controlling said last mentioned movement of the carriage.

2. A device as set forth in claim 1, in which said means operatively connecting the leading screw with the spindle comprise a plurality of parallel shafts mounted in said frame and interconnected by spur gears.

3. In a device for truing grinding worms for gear grinding machines, a frame, a spindle rotatably mounted in said frame, means for securing said worm on said spindle, means for rotating said spindle continuously in one direction, a leading screw rotatably mounted in said frame parallel with said spindle, means operatively connecting said leading screw with said spindle for rotating said leading screw in dependence of said spindle, means reversing the direction of rotation of said leading screw, a non-rotatable nut in engagement with said leading screw, a carriage slidably mounted in said frame for movement parallel to said spindle, means connecting said carriage with said nut, a truing tool mounted on said carriage, a second carriage mounted in said frame and carrying said first mentioned carriage, hydraulic means for moving said second carriage in a direction perpendicular to said spindle, and means operatively connected to said nut for controlling said hydraulic means.

4. In a device for truing grinding worms for gear grinding machines, a frame, a spindle rotatably mounted in said frame, means for securing said worm on said spindle, means for rotating said spindle continuously in one direction, a leading screw rotatably mounted in said frame parallel with said spindle, means operatively connecting said leading screw with said spindle for rotating said leading screw in dependence of said spindle, means reversing the direction of rotation of said leading screw, a non-rotatable nut in engagement with said leading screw, a carriage slidably mounted in said frame for movement parallel to said spindle, means connecting said carriage with said nut, a press roll freely rotatably mounted on said carriage with its axis of rotation parallel to said spindle, a plurality of peripheral grooves in said press roll, means for moving said carriage toward and from the periphery of said worm in a direction perpendicular to said spindle, and means operatively connected with said nut for controlling said last mentioned movement of the carriage.

5. In a device for truing grinding worms for gear grinding machines, a frame, a spindle rotatably mounted in said frame, means for securing said worm on said spindle, means for rotating said spindle continuously in one direction, a leading screw rotatably mounted in said frame parallel with said spindle, means operatively connecting said leading screw with said spindle for rotating said leading screw in dependence of said spindle, means reversing the direction of rotation of said leading screw, a non-rotatable nut in engagement with said leading screw, a carriage slidably mounted in said frame for movement parallel to said spindle, means connecting said carriage with said nut, a press roll freely rotatably mounted on said carriage with its axis of rotation parallel to said spindle, a plurality of peripheral grooves in said press roll, driving means for said press roll, means disconnecting said press roll from said driving means at a certain speed, a second carriage mounted in said frame and carrying said first mentioned carriage, hydraulic means for moving said second carriage in a direction perpendicular to said spindle, and means operatively connected to said nut for controlling said hydraulic means.

6. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a truing tool mounted on said carriage, means operatively connected with said spindle for reciprocating said carriage, means for moving said carriage toward and from the periphery of said worm in a direction perpendicular to said spindle, and means operatively connected with said reciprocating means for controlling said last mentioned movement of the carriage.

7. A device as set forth in claim 6, in which said means operatively connecting the leading screw with the spindle comprise a plurality of parallel shafts mounted in said frame and interconnected by spur gears.

8. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a truing tool mounted on said carriage, means operatively connected with said spindle for reciprocating said carriage, hydraulic means for moving said carriage toward and from the periphery of said worm in a direction perpendicular to said spindle, and means operatively connected with said reciprocating means for controlling said hydraulic means.

9. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a press roll freely rotatably mounted on said carriage with its axis of rotation parallel to said spindle, a plurality of peripheral grooves in said press roll, means for moving said carriage toward and from the periphery of said worm in a direction perpendicular to said spindle, and means operatively connected with said reciprocating means for controlling said last mentioned movement of the carriage.

10. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a press roll freely rotatably mounted on said carriage with its axis of rotation parallel to said spindle, a plurality of peripheral grooves in said press roll, driving means for said press roll, means disconnecting said press roll from said driving means at a predetermined speed, means for moving said carriage toward and from the periphery of said worm in a direction perpendicular to said spindle, and means operatively connected with said reciprocating means for controlling said last mentioned movement of the carriage.

11. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a press roll freely rotatably mounted on said carriage with its axis of rotation parallel to said spindle, a plurality of peripheral grooves in said press roll, driving means for said press roll, means disconnecting said press roll from said driving means at a predetermined speed, means operatively connected with said spindle for reciprocating said carriage, a second carriage mounted in said frame and carrying said first mentioned carriage, hydraulic means for moving said second carriage in a direction perpendicular to said spindle, and means operatively connected with said reciprocating means for controlling said hydraulic means.

12. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a press roll freely rotatably mounted on said carriage with its axis of rotation parallel to said spindle, a plurality of peripheral grooves in said press roll, driving means for said press roll, means disconnecting said press roll from said driving means at a predetermined speed, means operatively connected with said spindle for reciprocating said carriage, a second carriage mounted in said frame and carrying said first mentioned carriage, hydraulic means for moving said second carriage in a direction perpendicular to said spindle, means operatively connected with said reciprocating means for controlling said hydraulic means, and feeding means controlled by said hydraulic means for advancing said second carriage step-wise toward said worm for every stroke of said first mentioned carriage.

13. A device as set forth in claim 1 in which said truing tool comprises a casing secured to said carriage, a press roll provided with a plurality of annular grooves rotatably supported by said casing and adapted to engage the grinding worm on said spindle to be rotated thereby, an electric motor mounted on said casing and operatively connected with said press roll to rotate the same with a speed slightly below that at which the press roll is driven by the grinding worm, and an overrunning clutch operatively connected between said motor and said press roll for positively driving the press roll when the latter is out of engagement with the grinding worm.

14. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a truing tool mounted on said carriage, means operatively connected with said spindle for reciprocating said carriage, a second carriage mounted in said frame and carrying said first mentioned carriage, a cylindrical chamber in said frame, a piston reciprocable in said chamber, an axial threaded socket in said piston, a threaded spindle rotatably and non-reciprocably mounted in said second carriage and engaging said threaded socket, conduits connecting said chamber at both sides of said piston with a source of pressure fluid, valves in said conduits, means operatively connected with said reciprocating means to actuate said valves for admission and discharge of pressure fluid to and from said chamber, and means including a ratchet device operatively connected with said hydraulic means to rotate said threaded spindle through a predetermined angle for every stroke of said first mentioned carriage so as to advance said second carriage step-wise towards the periphery of said worm.

15. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a truing tool mounted on said carriage, means operatively connected with said spindle for reciprocating said carriage, a second carriage mounted in said frame and carrying said first mentioned carriage, a cylindrical chamber in said frame, a piston reciprocable in said chamber, an axial threaded socket in said piston, a threaded spindle rotatably and non-reciprocably mounted in said second carriage and engaging said threaded socket, conduits connecting said chamber at both sides of said piston with a source of pressure fluid, valves in said conduits, means operatively connected with said reciprocating means to actuate said valves for admission and discharge of pressure fluid to and from said chamber, means including a ratchet device operatively connected with said hydraulic means to rotate said threaded spindle through a predetermined angle for every stroke of said first mentioned carriage so as to advance said second carriage step-wise, and means connected with said carriage advancing means to disable the same after a predetermined total advance of said second carriage.

16. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a truing tool mounted on said carriage, means operatively connected with said spindle for reciprocating said carriage, a second carriage mounted in said frame and carrying said first mentioned carriage, a cylindrical chamber in said frame, a piston reciprocable in said chamber, an axial threaded socket in said piston, a threaded spindle rotatably and non-reciprocably mounted in said second carriage and engaging said threaded socket, conduits connecting said chamber at both sides of said piston with a source of pressure fluid, valves in said conduits, means operatively connected with said reciprocating means to actuate said valves for admission and discharge of pressure fluid to and from said chamber, means including a ratchet device operatively connected with said hydraulic means to rotate said threaded spindle through a predetermined angle for every stroke of said first mentioned carriage so as to advance said second carriage step-wise, means connected with said carriage advancing means to disable the same after a predetermined total advance of said second carriage, and manually operated means connected with said threaded spindle for adjusting the amount of advancement of said second carriage.

17. In a device for truing grinding worms for gear grinding machines, a frame, a spindle rotatably mounted in said frame, means for securing said worm on said spindle, means for rotating said spindle continuously in one direction, a carriage slidably mounted in said frame for movement parallel to said spindle, a tool holder on said carriage, two rods in said tool holder, a diamond secured to one end of each rod in a position to engage opposite flanks of a groove in said worm, means operatively connected with said spindle for reciprocating said carriage, means for moving said carriage toward and from the periphery of said worm in a direction perpendicular to said spindle, and means operatively connected with said reciprocating means for controlling said last mentioned movement of the carriage.

18. A device as in claim 17, including stationary cam means in engagement with the ends of said rods opposite to the diamonds, and spring means in said tool holders urging said rods against said stationary means, so that said rods slide on said stationary means during the reciprocating movement of said carriage.

19. A device as in claim 17, including stationary wave-shaped cam means in engagement with the ends of said rods opposite to the diamonds, and spring means in said tool holders urging said rods against said stationary wave-shaped means, so as to impart an oscillatory movement to said rods during the reciprocating movement of said carriage.

ALFRED RICKENMANN.

REFERENCES CITED

The following references are of record in the file of this patent:

UNITED STATES PATENTS

| Number | Name | Date |
|---|---|---|
| 1,701,675 | Hoagland | Feb. 12, 1929 |
| 2,082,728 | Wood | June 1, 1937 |
| 2,286,046 | Wickman | June 9, 1942 |
| 2,317,411 | Seyferth | Apr. 27, 1943 |
| 2,340,192 | Locke | Jan. 25, 1944 |
| 2,407,577 | Rickenmann | Sept. 10, 1946 |
| 2,477,418 | Polk | July 26, 1949 |